United States Patent

Tsubata

[11] Patent Number: 5,974,002
[45] Date of Patent: Oct. 26, 1999

[54] ELECTRONIC WATCH USING A THERMOELEMENT

[75] Inventor: Keisuke Tsubata, Chiba, Japan

[73] Assignee: Seiko Instruments Inc., Japan

[21] Appl. No.: 08/926,890

[22] Filed: Sep. 10, 1997

[51] Int. Cl.[6] .............................. G04B 1/00; G04C 3/00; H02J 3/32

[52] U.S. Cl. ........................... 368/64; 368/204; 310/306; 320/61

[58] Field of Search ........................ 368/64.66, 203–205; 136/205, 211, 212; 307/44–48, 71, 72

[56] References Cited

U.S. PATENT DOCUMENTS

| | | | |
|---|---|---|---|
| 4,106,279 | 8/1978 | Martin et al. | 368/64 |
| 4,213,292 | 7/1980 | Dolezal et al. | 368/204 |
| 5,517,468 | 5/1996 | Inoue et al. | 368/64 |
| 5,705,770 | 1/1998 | Ogasawara et al. | 136/205 |

Primary Examiner—Vit Miska
Attorney, Agent, or Firm—Adams & Wilks

[57] ABSTRACT

An electronic timepiece comprises a casing formed of a thermally conductive material and having a first outer case portion and a second outer case portion connected together to define a space therebetween. The first outer case portion is exposed to the atmosphere and has a first temperature, and the second outer case portion is disposed in physical contact with the wrist of a user during use of the electronic timepiece and has a second temperature different from the first temperature. A thermoelectric element is disposed in the space of the casing for generating an electromotive force due to heat transfer between the first and second outer case portions resulting from the difference between the first and second temperatures. The thermoelectric element has a first support member at one end thereof connected to the first outer case portion of the casing and a second support member at a second end opposite the first end and connected to the second outer case portion of the casing. A conductive element is disposed between the second outer case portion of the casing and the second support member of the thermoelectric element for conducting heat therebetween and absorbing an external force applied to the thermoelectric element.

32 Claims, 5 Drawing Sheets 902   901   903

ELECTRONIC WATCH USING A THERMOELEMENT

BACKGROUND OF THE INVENTION

1. Field of the Invention

The present invention relates to an electronic watch using a thermoelement as an energy source.

2. Description of the Related Art

Conventionally, there has been recently studied an electronic equipment using a thermoelement that develops an electromotive force based on the Seebeck effect as an energy source instead of a battery. For example, FIG. 9 is a diagram showing the structure of an electronic wrist watch (hereinafter referred to as "thermo-electric type wrist watch") with a thermoelement as an energy source. The thermo-electric type wrist watch includes a movement 901, a thermo-electric type generator 902, an electric energy battery, and a casing 903 of a wrist watch consisting of a metal bottom portion, a frame portion and a metal top portion. The thermo-electric type wrist watch thus structured is disclosed, for example, in Japanese Patent Unexamined Publication No. Sho 55-20483. However, a thermoelement module made from the viewpoints of a power capacity and downsizing or an electronic equipment using a thermoelement module have not yet come to practical use.

The thermoelement requires the structure for supporting both sides thereof, but assuming that its first support member is at a heat absorbing side whereas its second support member is at a heat radiating side, in the case where a difference in temperature is given such that a temperature at the heat absorbing side is higher than that at the heat radiating side, the transmission of heat within an n-type semiconductor and a p-type semiconductor is converted into a current so that an electromotive force can be obtained by output terminal portions at both ends thereof. Since the electromotive force increases with a difference in temperature, in order to obtain a larger difference in temperature for increasing the electromotive force, there is required that the structure, the material or the like of the support member is devised to enhance a heat absorption efficiency or a heat radiation efficiency. For achieving this, it is desirable that the first support member is brought in contact with a rear cap which is in contact with an arm that is a heat source, and the second support member is brought in contact with an outer packaging case which is in contact with an outside air.

However, the thermoelement is low in strength against an external force. In particular, since the n-type semiconductors and the p-type semiconductors are shaped in a slender column and are erected in a large number of alignments, if a force is applied to the thermoelement laterally with respect to a direction of the transmission of heat within the n-type semiconductor and the p-type semiconductor, there is a risk that the thermoelement is destroyed. Therefore, since the structure in which the first and second support bodies which support the thermoelement are brought in contact with outer packaging parts or the like, respectively, makes a shock resistance low, the thermoelement needs to be protected. Also, the structure in which the first and second support bodies are brought in contact with the outer packaging parts, respectively, makes it difficult to assemble the thermoelement and the outer packaging parts, which is a problem.

SUMMARY OF THE INVENTION

An object of the present invention is to provide an electronic watch having a thermoelement module which is able to enhance a heat absorption efficiency and a heat radiation efficiency.

Another object of the present invention is to provide an electronic watch having a thermoelement module which is able to enhance a strength against an external force.

Still another object of the present invention is to provide an electronic watch having a thermoelement module which is not easily influenced by an increase in temperature within a case of the watch.

BRIEF DESCRIPTION OF THE DRAWINGS

These and other objects, features and advantages of the present invention will become more fully apparent from the following detailed description taken with the accompanying drawings in which.

DETAILED DESCRIPTION OF THE PREFERRED EMBODIMENTS

The present invention has been made to solve the above problem, and therefore the present invention provides an electronic watch in which one support member supporting a thermoelectric element (hereinafter referred to as a thermoelement) contacts with an outer packaging case. A part or all of the support member is embedded into a groove defined in the outer packaging case. An elastic heat conductive plate is disposed between the other support member supporting the thermoelement and a rear cap.

Now, a description will be given in more detail of preferred embodiments of the present invention with reference to the accompanying drawings.

Figure 1:
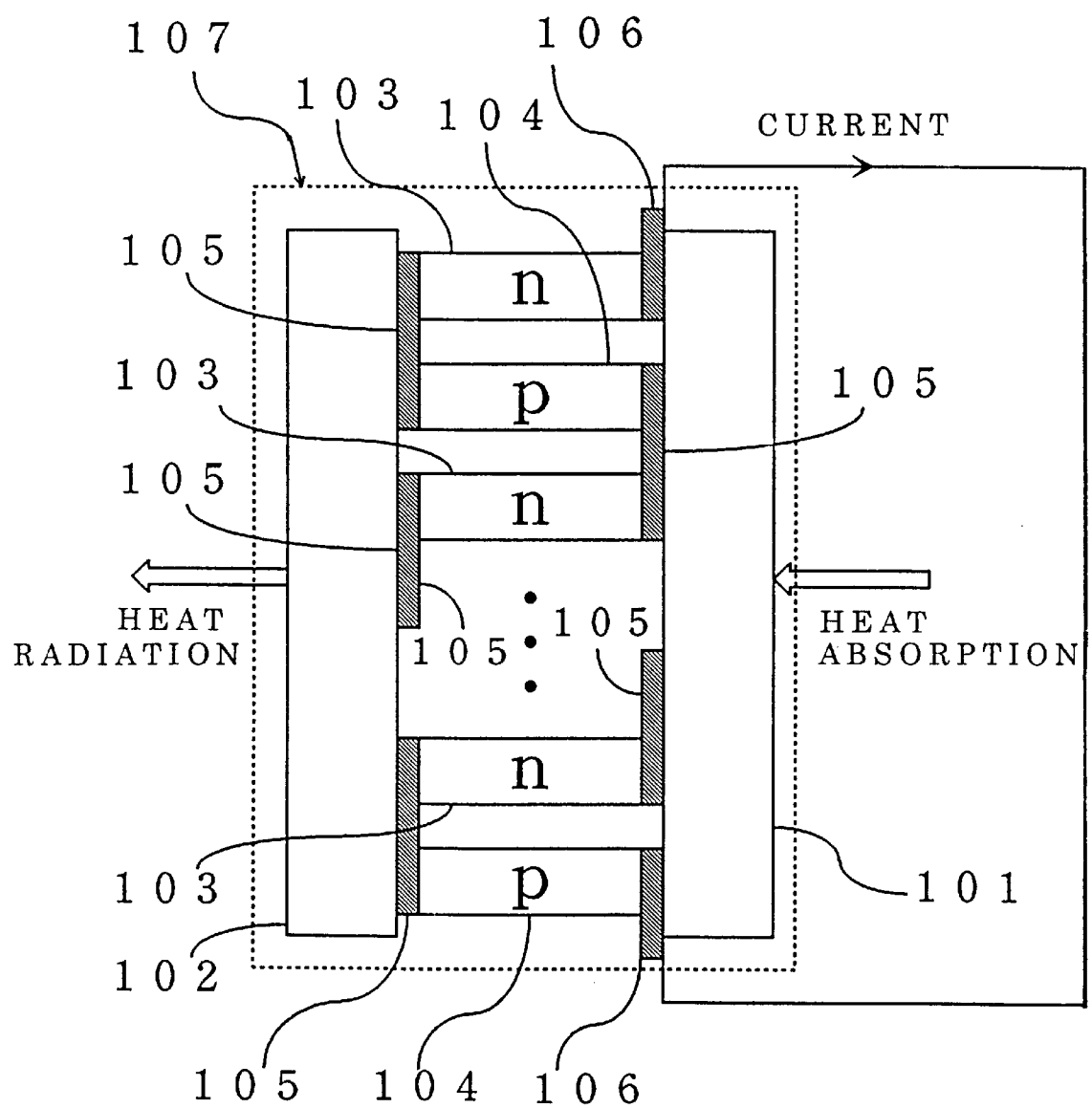
FIG. 1 is a diagram showing a principle of power generation of a thermoelement in accordance with the present invention.

FIG. 1 is a diagram showing a principle of power generation of a thermoelement in accordance with the present invention. Since a first support member 101 and a second support member 102 support connecting portions of n-type semiconductors 103 and p-type semiconductors 104 of a thermoelement, surfaces of the first and second support bodies 101 and 102 which are in contact with the connecting portions must be electrically insulated. The first support member 101 is, for example, made of silicon or aluminum onto which an oxide film is stuck and disposed at a heat absorption side. The second support member 102 is, for example, made of silicon or aluminum onto which an oxide film is stuck and disposed at a heat radiation side. In the case where a difference in temperature is given such that a temperature at the heat absorption side is higher than that at the heat radiation side, a heat is transmitted from the first support member 101 to the second support member 102. In this situation, in the n-type semiconductors 103 (for example, bismuth-tellurium base, lead-tellurium base or iron-silicide base), electrons are moved toward the second support member 102 on the heat radiation side. In the p-type semiconductors 104 (for example, bismuth-tellurium base, lead-tellurium base or iron-silicide base), positive holes are moved toward the second support member 102 on the heat radiation side. Because the n-type semiconductors 103 and the p-type semiconductors 104 are electrically connected in series through the connecting portions 105 (for example, electrodes), the transmission of a heat is converted into a current, thereby being capable of obtaining an electromotive force through the output terminal portions 106.

Figure 8:
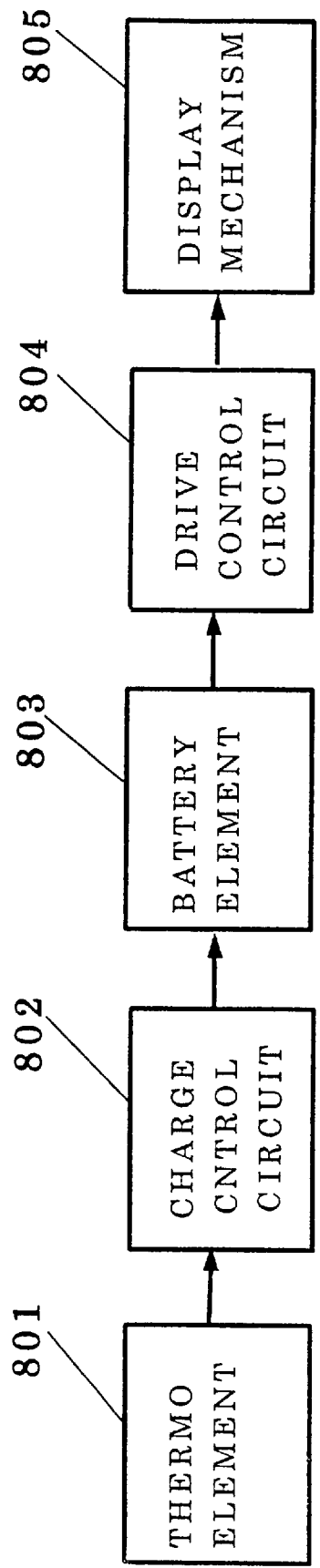
FIG. 8 is a circuit block diagram showing a principle of the operation of an electronic watch with the thermoelement of the present invention as an energy source.
Figure 9:
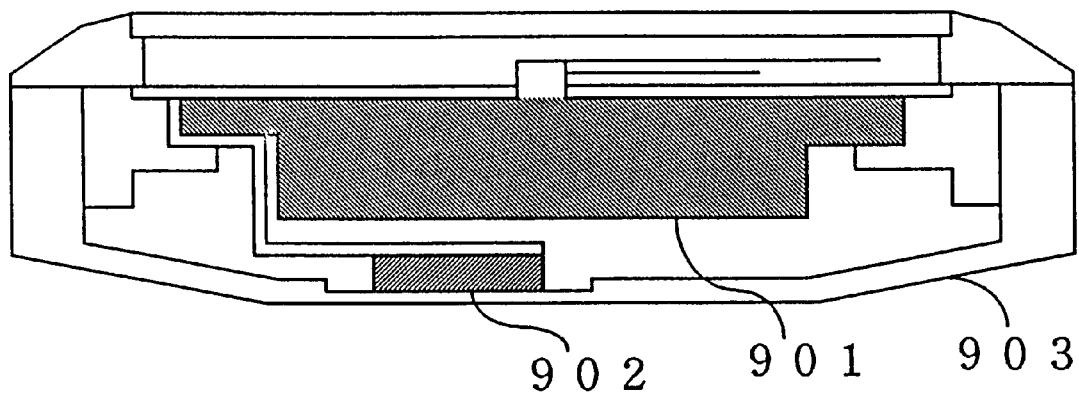
FIG. 9 is a cross-sectional view showing the structure of a conventional electronic wrist watch with a thermoelement as an energy source.

FIG. 8 is a circuit block diagram showing a principle of the operation of an electronic watch with the thermoelement of the present invention as an energy source. When a difference in temperature is given to a thermoelement 801 to develop an electromotive force, an electricity is charged in a battery element 803 through a charge control circuit 802. A drive control circuit 804 is driven by the electricity charged in the battery element 803 so that a time is displayed on a display mechanism 805. In the case of using the electronic watch as an electronic wrist watch, it is desirable that a difference in temperature which must be given to the thermoelement 801 is 2° C. or higher when the number of elements is, for example, about 4000 although depending on the number of elements.

Figure 2:
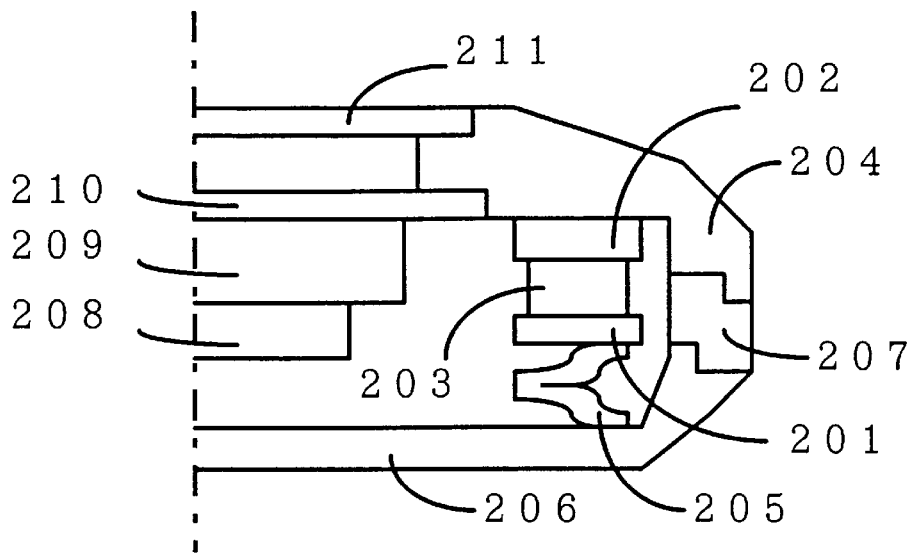
FIG. 2 is a diagram showing a first structure of an electronic watch in accordance with the present invention.

FIG. 2 is a diagram showing an embodiment of a structure of an electronic watch using the thermoelement of the present air invention. A movement 209 is driven by a storage battery element 208. A dial 210 is in contact with the movement 209. A glass cover 211 protects the dial 210. When the electronic watch is put on an arm, a first outer case portion or rear cap 206 is in contact with the arm and warmed with a body temperature. The heat of the rear cap 206 is transmitted to a first support member 201 of the thermoelement through a heat conductive plate 205. It is desirable that the rear cap 206 and the heat conductive plate 205 is made of a material high in heat conductivity so that the heat of the arm is efficiently transmitted to the first support member 201. The second support member 202 of the thermoelement transmits a heat to an outer packaging case 204 since it is in contact with the outer packaging case 204. The packaging case 204 supports the dial 210 and the glass cover 211. Since the heat escapes from the outer packaging case 204 to the surrounding air, a difference in temperature is caused between the first support member and the second support member 202 of the thermoelement 203, and the thermoelement 203 develops an electromotive force. It is desirable that the outer packaging case 204 is made of a material high in heat conductivity. In this example, since the second support member 202 is in contact with the outer packaging case 204 not through another parts therebetween, a heat can be efficiently radiated. If other parts are disposed between the second support member 202 and the outer packaging case 204, not only a heat transmission path is narrowed by those parts but also the heat conductivity is lowered by use of an adhesive to the contact portion between the parts with the result that the heat radiation efficiency as well as the power generation efficiency is deteriorated.

Also, a heat insulating member 207 is disposed between the rear cap 206 and the outer packaging case 204. The heat insulating member 207 has a function to prevent the heat of the rear cap 206 from being transmitted to the outer packaging case 204 not through the thermoelement 203. The provision of the heat insulating member 207 makes most of the heat absorbed with the rear cap 206 transmitted to the thermoelement with the result that the power generation efficiency is improved. The heat insulating member 207 is selected from a material a heat conductivity of which is sufficiently low in comparison with the synthetic heat conductivity of the heat conductive plate 205, the first support member 201, the thermoelement 203 and the second support member 202.

The heat conductive plate 205 is formed by bending an elastic plate at at least one portion by 90° or more so that it is L-shaped in section. The heat conductive plate 205 protects the thermoelement by absorbing an excessive external force applied to the thermoelement which is lower in strength against an external force when assembling the parts or receiving an impact from an external source. Also, although not shown, the same effect is obtained even though at least one portion of the heat conductive plate 205 is bent by less than 90°.

Figure 3:
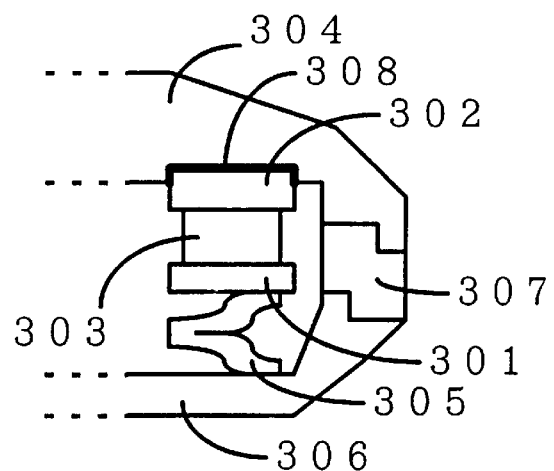
FIG. 3 is a diagram showing a part of a second structure of an electronic watch in accordance with the present invention.

FIG. 3 is a diagram showing a second embodiment of a structure of an electronic watch using the thermoelement of the present invention. An outer packaging case 304 includes a recess or groove 308 into which a part of a second support member 302 is embedded, and a part of the second support member 302 is embedded into an outer packaging case 304. With this structure, because a portion of the second support member 302 which is in contact with an air within the watch is reduced, the second support member 302 is restrained from increasing in temperature due to the warmed air within the watch, thereby being capable of providing a larger difference in temperature between the first and second support bodies of the thermoelement, thus enhancing the power generation efficiency.

Figure 4:
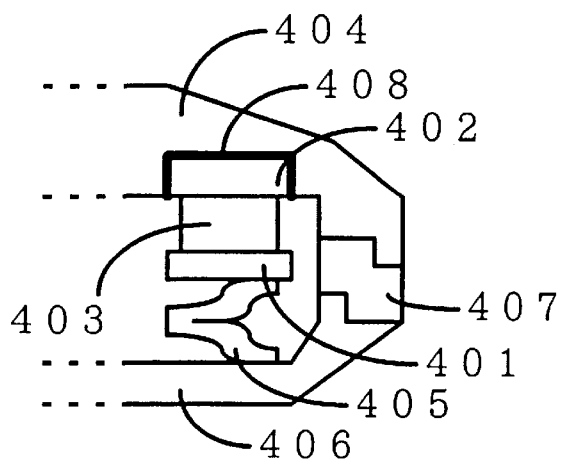
FIG. 4 is a diagram showing a part of a third structure of an electronic watch in accordance with the present invention.

FIG. 4 is a diagram showing a third embodiment of a structure of an electronic watch using a thermoelement of the present invention. An outer packaging case 404 has a groove 408 into which all of a second support member 402 is embedded, and all of the second support member 402 is embedded into the outer packaging case 404. With this structure, because a portion of the second support member 402 which is in contact with an air within the watch approaches a minimum value, the second support member 402 is restrained from increasing in temperature due to the warmed air within the watch as much as possible, thereby being capable of providing a still larger difference in temperature between the first and second support bodies of the thermoelement, thus enhancing the power generation efficiency.

Figure 5:
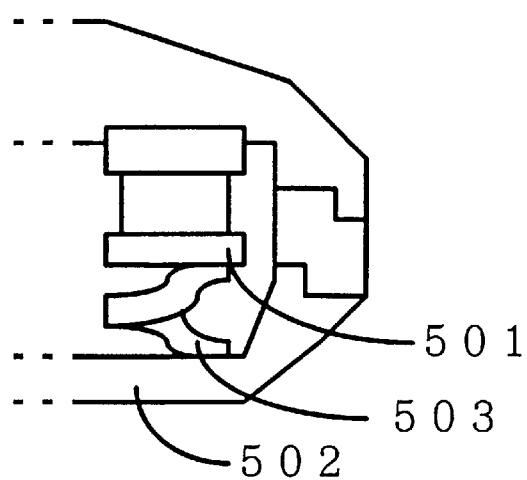
FIG. 5 is a diagram showing a part of a fourth structure of an electronic watch in accordance with the present invention.

FIG. 5 is a diagram showing a fourth embodiment of a structure of an electronic watch using the thermoelement of the present invention. A heat conductive plate 503 is fabricated by notching a part of an elastic plate and expanding both sides separated by notching vertically. Also, since a heat conductive plate 503 can be made relatively thinly, the effect is exhibited when the entire watch is intended to be made thinly.

Figure 6:
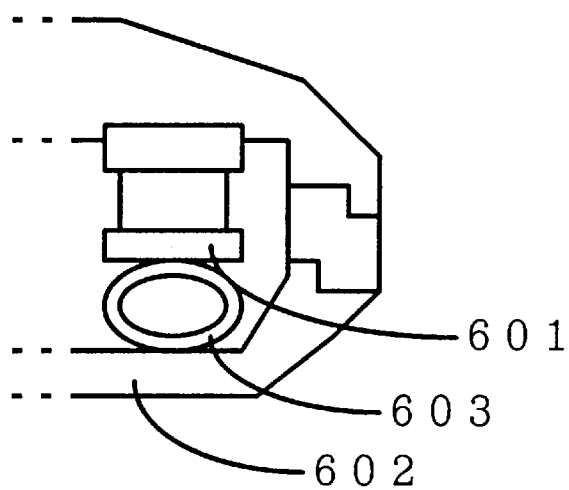
FIG. 6 is a diagram showing a part of a fifth structure of an electronic watch in accordance with the present invention.

FIG. 6 is a diagram showing a fifth embodiment of a structure of an electronic watch using the thermoelement of the present invention. A heat conductive plate 603 is formed by shaping an elastic material into a cylinder. Since the sectional shape of the heat conductive plate 603 is cylindrical, two heat transmission paths are provided between a rear cap 602 and a first support member 601, and if the heat conductive plate is further bent to a certain degree, since a contact area of the heat conductive plate 603 and the rear cap 602 or a contact area of the heat conductive plate 603 and the first support member 601 can be increased, a heat can be more effectively transmitted.

Figure 7:
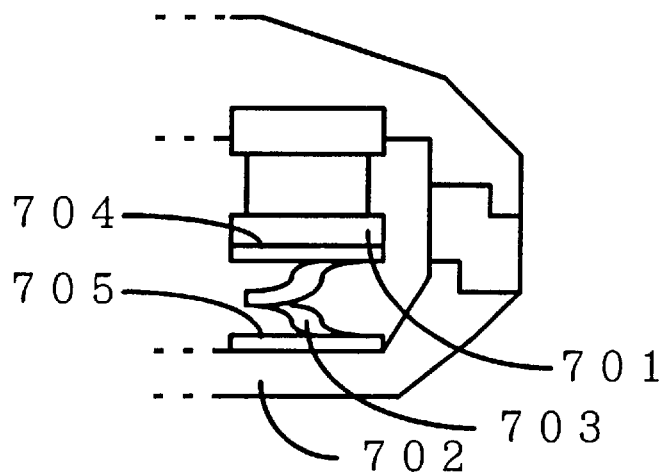
FIG. 7 is a diagram showing a part of a sixth structure of an electronic watch in accordance with the present invention.

FIG. 7 is a diagram showing a sixth embodiment of a structure of an electronic watch using the thermoelement of the present invention. A heat conductive plate 703 is fabricated by notching an elastic plate and bending both sides of the notched portion. The heat conductive plate 703 has a contact portion 704 on one end at the first support member 701 side and a contact portion 705 on the other end on a rear cap 702 side, and because the respective contact portions 704 and 705 contact the first support member 701 or the rear cap 702 with a larger area, a heat can be efficiently transmitted. Further, if the respective contact portions have a large area, since they can contact the first support member 701 and the rear cap 702 stably, positioning as well as assembling is facilitated.

In the above-described embodiments, the use of one heat conductive plate was described. However, using an elastic heat conductive plate further between the second support member and the outer packaging case, both sides of the thermoelement can be supported and protected by the elastic heat conductive plate.

Also, the spring constant of the heat conductive plate is designed such that the strength of the thermoelement is previously examined to prevent a force stronger than the examined strength of the thermoelement from being applied to the thermoelement.

In the above-described embodiments, it is assumed that the first support member is at a high temperature side whereas the second support member is at a low temperature side. However, when a daylight is directly applied to the watch, or a user remover the watch from the arm, etc., there is a case in which the first support member side is at the low temperature side whereas the second support member side is at the high temperature side. In this case, a rectifying action as well as an over-charge preventing action are conducted within the charge control circuit 802 so that charging is conducted with no vain.

As was described above, according to the present invention, a heat can be effectively radiated by making one support member of thermoelement contact the outer packaging case. Further, a part or all of one support member of the thermoelement is embedded into the outer packaging case, thereby being capable of making it hard to influence an increase in temperature within the case of the watch.

Further, the elastic heat conductive plate having a curve portion at at least one portion, a notch at at least one portion, or a cylindrical shape is used for connection between the thermoelement and the outer packaging case, thereby effectively conducting heat conduction and also preventing an excessive force from being applied to the thermoelement in assembling or receiving an impact, thus being capable of protecting the thermoelement.

The foregoing description of preferred embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electronic watch using a thermoelement module as an energy source, the electronic watch comprising:

a casing having a first outer case portion exposed to the atmosphere and a second outer case portion for contacting the wrist of a user; and a thermoelement module disposed within the casing, the thermoelement module comprising a plurality of n-type semiconductors; a plurality of p-type semiconductors; a plurality of connecting elements for connecting the plurality of n-type semiconductors and the plurality of p-type semiconductors such that the n-type semiconductors and the p-type semiconductors are connected alternately and electrically in series; a plurality of output terminals for outputting an electromotive force from the connected pluralities of n-type semiconductors and p-type semiconductors; a first support member to which alternate ones of the plurality of connecting portions are fixed; and a second support member to which the remaining ones of the plurality of connecting elements other than the ones fixed to the first support member are fixed, the first outer case portion of the casing having a recess for receiving and supporting at least a portion of one of the first support member and the second support member in direct contact therewith.

2. An electronic watch as claimed in claim 1; wherein the first support member or the second support member is disposed completely within the recess of the first outer case portion of the casing.

3. An electronic watch as claimed in claim 1; further comprising an elastic heat conductive plate disposed between the second outer case portion and one of the first support member and the second support member which is not supported by the first outer case portion of the casing for conducting heat in a first direction from the second outer case portion to the first or second support member and for absorbing external forces applied to the first or second support member in a second direction generally perpendicular to the first direction.

4. An electronic watch as claimed in claim 3; wherein the elastic heat conductive plate has at least one curved portion having a curvature of 90° or more.

5. An electronic watch as claimed in claim 3; wherein the elastic heat conductive plate has at least one curved portion having a curvature less than 90°.

6. An electronic watch as claimed in claim 3; wherein the elastic heat conductive plate has at least one notch.

7. An electronic watch as claimed in claim 3; wherein the elastic heat conductive plate is cylindrical.

8. An electronic watch as claimed in claim 3; wherein the elastic heat conductive plate has a first large-area contact portion at a first end thereof for contacting one of the first support member and the second support member which is not supported by the first outer case portion of the casing, and a second large-area contact portion at a second end opposite the first end for contacting the second outer case portion.

9. An electronic watch as claimed in claim 1; wherein each of the connecting elements respectively connects one of the n-type semiconductors and one of the p-type semiconductors together.

10. An electronic watch as claimed in claim 9; wherein each of the connecting elements respectively connects a plurality of the n-type semiconductors and a plurality of the p-type semiconductors together.

11. An electronic timepiece comprising: a casing formed of a thermally conductive material and having a first outer case portion and a second outer case portion connected together to define a space therebetween, the first outer case portion being exposed to the atmosphere and having a first temperature, and the second outer case portion being in physical contact with the wrist of a user during use of the electronic timepiece and having a second temperature different from the first temperature; and a thermoelectric element disposed in the space of the casing for generating an electromotive force due to heat transfer between the first and second outer case portions resulting from the difference between the first and second temperatures, the thermoelectric element having a first support member connected directly to the first outer case portion of the casing and a second support member connected to the second outer case portion of the casing.

12. An electronic timepiece as claimed in claim 11; wherein the thermoelectric element has a plurality of n-type semiconductors, a plurality of p-type semiconductors, a plurality of connecting elements for connecting the plurality of n-type semiconductors and the plurality of p-type semiconductors such that the n-type semiconductors and the p-type semiconductors are connected alternately and electrically in series, and a plurality of output terminals for outputting the electromotive force from the connected n-type semiconductors and p-type semiconductors.

13. An electronic watch as claimed in claim 12; wherein each of the connecting elements respectively connects one of the n-type semiconductors and one of the p-type semiconductors together.

14. An electronic timepiece as claimed in claim 11; wherein the first outer case portion of the casing has a recess which opens into the space of the casing; and wherein only a portion of the first support member of the thermoelectric element is disposed in the recess of the first outer case portion of the casing.

15. An electronic timepiece as claimed in claim 11; wherein the first outer case portion of the casing has a recess which opens into the space of the casing; and wherein the first support member of the thermoelectric element is disposed completely within the recess of the first outer case portion of the casing.

16. An electronic timepiece as claimed in claim 11; further comprising an elastic heat conductive element disposed between the second support member of the thermoelectric element and the second outer case portion of the casing for conducting heat between the second outer case portion and the second support member and for absorbing external forces applied to the thermoelectric element.

17. An electronic timepiece as claimed in claim 16; wherein the elastic heat conductive element has a first end in direct contact with the second support member and a second end opposite the first end in direct contact with the second outer case portion of the casing.

18. An electronic timepiece as claimed in claim 17; wherein the elastic heat conductive element is generally L-shaped.

19. An electronic timepiece as claimed in claim 17; wherein the elastic heat conductive element is generally cylindrical-shaped.

20. An electronic timepiece as claimed in claim 11; further comprising a time display mechanism for displaying time; and a drive control circuit powered by the electromotive force generated by the thermoelectric element for driving the time display mechanism to display time.

21. An electronic watch as claimed in claim 13; wherein each of the connecting elements respectively connects a plurality of the n-type semiconductors and a plurality of the p-type semiconductors together.

22. An electronic timepiece comprising:

a casing formed of a thermally conductive material and having a first outer case portion and a second outer case portion connected together to define a space therebetween, the first outer case portion being exposed to the atmosphere and having a first temperature, and the second outer case portion being disposed in physical contact with the wrist of a user during use of the electronic timepiece and having a second temperature different from the first temperature;

a thermoelectric element disposed in the space of the casing for generating an electromotive force due to heat transfer between the first and second outer case portions resulting from the difference between the first and second temperatures, the thermoelectric element having a first support member connected to the first outer case portion of the casing and a second support member connected to the second outer case portion of the casing;

conductive means disposed between the second outer case portion of the casing and the second support member of the thermoelectric element for conducting heat therebetween and absorbing external forces applied to the thermoelectric element; and time display means powered by the electromotive force generated by the thermoelectric element for displaying time.

23. An electronic timepiece according to claim 22; wherein the conductive means comprises an elastic heat conductive element.

24. An electronic timepiece according to claim 23; wherein the elastic heat conductive element has a first end in direct contact with the second support member of the thermoelectric element and a second end in direct contact with the second outer case portion of the casing.

25. An electronic timepiece according to claim 24; wherein the elastic heat conductive element is generally L-shaped.

26. An electronic timepiece according to claim 24; wherein the elastic heat conductive element is generally cylindrical-shaped.

27. An electronic timepiece according to claim 22; wherein the first outer case portion of the casing has a recess which opens into the space of the casing; and wherein only a portion of the first support member of the thermoelectric element is disposed in the recess of the first outer case portion of the casing.

28. An electronic timepiece according to claim 22; wherein the first outer case portion of the casing has a recess which opens into the space of the casing; and wherein the first support member of the thermoelectric element is disposed completely within the recess of the first outer case portion of the casing.

29. An electronic timepiece according to claim 22; wherein the thermoelectric element has a plurality of n-type semiconductors, a plurality of p-type semiconductors, a plurality of connecting elements for connecting the plurality of n-type semiconductors and the plurality of p-type semiconductors such that the n-type semiconductors and the p-type semiconductors are connected alternately and electrically in series, and a plurality of output terminals for outputting the electromotive force from the connected plurality of n-type semiconductors and p-type semiconductors.

30. An electronic timepiece according to claim 22; wherein the first support member of the thermoelectric element is connected directly to the first outer case portion of the casing.

31. An electronic watch as claimed in claim 29; wherein each of the connecting elements respectively connects one of the n-type semiconductors and one of the p-type semiconductors together.

32. An electronic watch as claimed in claim 31; wherein each of the connecting elements respectively connects a plurality of the n-type semiconductors and a plurality of the p-type semiconductors together.

\* \* \* \* \*